United States Patent [19]
Cole, III

[11] Patent Number: 6,128,138
[45] Date of Patent: Oct. 3, 2000

[54] REFLECTIVE LASER COLLIMATOR

[75] Inventor: Ira E. Cole, III, Rockford, Ill.

[73] Assignee: W. A. Whitney Co., Rockford, Ill.

[21] Appl. No.: 09/353,936

[22] Filed: Jul. 15, 1999

[51] Int. Cl.[7] ............................ G02B 27/30; G02B 27/14
[52] U.S. Cl. ............................................ 359/641; 359/637
[58] Field of Search ................................... 359/641, 618, 359/640, 637; 356/153

[56] References Cited

U.S. PATENT DOCUMENTS

| | | | |
|---|---|---|---|
| 5,001,718 | 3/1991 | Burrows et al | 372/33 |
| 5,020,906 | 6/1991 | Paz | 356/138 |
| 5,118,918 | 6/1992 | Serrano | 219/121.78 |
| 5,136,136 | 8/1992 | Karube et al. | 219/121.73 |
| 5,399,835 | 3/1995 | Nakata | 219/121.78 |
| 5,442,436 | 8/1995 | Lawson | 356/153 |
| 5,493,095 | 2/1996 | Brushchi et al. | 219/121.75 |
| 5,637,243 | 6/1997 | Sato et al. | 219/121.67 |
| 5,667,707 | 9/1997 | Klingel et al. | 219/121.67 |
| 5,670,064 | 9/1997 | Nakata | 219/121.6 |
| 5,756,961 | 5/1998 | Sato et al. | 219/121.67 |
| 5,777,807 | 7/1998 | Bar et al. | 359/845 |
| 5,854,460 | 12/1998 | Graf et al. | 219/121.67 |
| 5,889,256 | 3/1999 | Osanai | 219/121.74 |

FOREIGN PATENT DOCUMENTS 2327277  1/1999  United Kingdom.

OTHER PUBLICATIONS

Optimizing Cutting and Welding Processing by Controlling the Laser Beam, D. Christopher Hermanns, presented in Lasers in the Workpiece Session at Manufacturing '96 Conference, Sep. 4, 1996.

Transient Behaviour of Optical Components and their Correction by Adaptive Optical Elements, M. Bea, S. Borik, A. Giesen, U. Zoske No Date.

Bestform Laser Lenses, Speical Optics Magazine No Date.

High Power $CO_2$ Laser Beam Collimator, II–VI Incorporated Brochure Sep. 1992.

Laser Machining, Inc. Data Sheet No Date.

Solutions Oriented Beam Delivery from LMI Advertising in Industrial Laser Review Mar. 1997.

Laser, Anthony E. Siegman, University Science Books No Date.

Beam Expander–Condensers, II–VI Incorporated No Date.

*Primary Examiner*—Georgia Epps
*Assistant Examiner*—Michael A Lucas
*Attorney, Agent, or Firm*—Leydig, Voit & Mayer, Ltd.

[57] ABSTRACT

A reflective collimator for a laser, such as for use in a cutting or welding machine tool. The collimator requires no more than three mirrors, and can be configured with only two. The relative positions of a convex/concave mirror pair are adjusted to adjust the divergence of the output collimated beam. Adjustment is accomplished by translating two of the mirrors in linear paths along respective beam paths established in the collimator. A linkage interconnects the two translatable mirrors and includes a coupling which incorporates the triangular geometry of the beam path established by the mirrors, so that the translatable mirrors are linked to maintain alignment throughout the range of collimator adjustment. When one of the translatable mirrors is adjusted the linkage causes the second to track the first while maintaining precise alignment in the collimator.

30 Claims, 10 Drawing Sheets

REFLECTIVE LASER COLLIMATOR

FIELD OF THE INVENTION

The present invention generally relates to a family of devices known as collimators or telescopes, which increase or decrease the size of an input light beam and more particularly relates to a servo controlled reflective collimator for adjusting the divergence of a high power laser beam in a beam path of a laser-equipped machine tool such as laser cutting machine or laser welding machine.

BACKGROUND OF THE INVENTION

Collimators are optical devices, belonging to a family of devices known as collimators or telescopes, which include products called beam expanders and condensers. Such devices, advantageous to the laser-equipped machine tool industry, increase or decrease the size of and change the divergence or angular characteristics of a light beam passed through it. Such devices also have other characteristics and functions known to those skilled in the trade. Manufacturers of laser optics publish literature providing information on design variations and examples of use, for example: II–IV Incorporated publication 1685 Revised 3/92, Beam Expander-Condensers, Copyright 1988.

Collimators may be constructed of transmissive optics such that the light beam is passed through the optics. They are commonly used in laser equipped machine tools up to the approximately three kilowatt power level and sometimes above. Use of transmissive collimators with lasers with power levels above three kilowatts becomes increasingly problematic due to limits on energy density that transmissive optic materials can withstand and due to a phenomenon called thermal lensing. Thermal lensing is the distortion of an optical component caused by heat absorption typically from an input beam of light. The distortion can influence the divergence and mode quality of the beam passing through or reflecting from the optical component and cause detrimental shifts of focus position and diameter.

Collimators are also constructed of reflective optics, combinations of flat and shaped mirrors, such that the light beam is reflected from these optical elements. Reflective optical materials can withstand greater energy densities without damage and thermal lensing is not as severe in reflective optics as compared to transmissive optics. Thus reflective collimators are more suitably used in high power laser applications.

Known reflective collimators consist of four reflective optics. By adjusting the distance between specific optics the divergence of the output beam can be varied. U.S. Pat. No. 5,442,436 illustrates such a system as does II–VI Incorporated sales literature "Model RBC-Dx Reflective Beam Collimator" dated September 1992. The mirrors are arranged in pairs in parallel planes. To change the size of the output beam one pair of mirrors is moved parallel to the input and output beams and the distance between the pairs is changed.

It is advantageous to reduce the number of optical components used in the beam delivery system. Each optic adds complexity to the task of aligning a beam path, is a possible source of beam distortion and absorbs some energy from the beam reducing overall system efficiency. Optical elements degrade with use. Each optical element adds to the overall cost of system maintenance.

SUMMARY OF THE INVENTION

In view of the foregoing, it is a general aim of the present invention to reduce the number of mirrors in an adjustable reflective collimator.

In that regard, an object of the present invention is to provide a reflective collimator having fewer optical elements, some of which are mechanically linked so as to maintain optical alignment during relative movement between mirrors and such that the divergence of the beam can be changed by changing the position of a single adjustment mechanism.

An objective of the present invention is to produce a reflective collimator with a reduced number of optical mirrors, in which a minimum number of mirrors require movement for changing the size, divergence, or collimation characteristics of a beam and such that the characteristics can be changed by changing the position of a single adjustment mechanism.

It is a more detailed object to provide a three mirror reflective collimator in which movement of only two of the mirrors is necessary to adjust beam characteristics, with the moving mirrors being connected by a linkage which precisely maintains optical alignment through their range of movement and such that the output beam divergence can be changed by changing the position of a single adjustment mechanism.

A further object is to provide such a collimator which is suitable for adjustment under the control of a single servo control system.

It is another object of the invention to provide a collimator in which a single servo motor adjusts the beam characteristics with a mechanical linkage utilized to maintain optical alignment between two moving mirrors moving in non-parallel axes.

In a broader view, it is an object of the present invention to provide a robust and reliable collimator, so as to allow adjustment of beam characteristics in a continuous manner as conditions change which may require the alteration of the beam characteristics, and which utilizes two mirrors, mounted to move on non-parallel axes and connected by a linkage to precisely maintain their optical alignment.

It is a feature and an advance of the invention that reliable adjustment of beam characteristics can be achieved using only two translatable mirrors, with the optical geometry changed by movement of the mirrors connected by a mechanical linkage, precisely translating one mirror, slideably mounted in a non-parallel axis relative to the other moving mirror, in response to movement of the other moving mirror which is a slideably mounted driven mirror. In its currently preferred form, a third fixed mirror is utilized because it provides sufficient flexibility to reduce the overall size of the machine in which the collimator is used.

It is a further feature of the invention that a reflective collimator is provided in which the beam path through the collimator defines a triangular geometry, and that two mirrors, mounted on non-parallel axes translate, along the beam path, for adjusting beam characteristics and are connected by a linkage including a pivotable coupling having a triangular geometry proportional to the triangular beam path geometry.

It is a further feature of the invention that only a single servo system is required to drive the collimator, with a robust and reliable mechanical linkage interconnecting movable mirrors, so that the collimator can be controlled by the Computer Numerical Control which controls a laser-equipped machine tool and continuously adjusts the beam characteristics as the beam delivery head traverses the workpiece and as the beam characteristics change due to changes in laser power.

Other objects and advantages will become more apparent from the following detailed description when taken in conjunction with the accompanying drawings.

DETAILED DESCRIPTION OF THE PREFERRED EMBODIMENTS

While the invention will be described in connection with certain preferred embodiments, there is no intent to limit it to those embodiments. On the contrary the intent is to cover all alternatives, modifications and equivalents as are included within the spirit and scope of the invention as defined by the appended claims.

The following description will proceed to first identify the mechanical and optical elements of the collimator and their physical locations, then to examine the beam path through the collimator, then to describe how collimator adjustment alters the beam divergence, then to describe the details of the mounting arrangement and linkage which operates, according to the present invention, to adjust beam divergence. Alternative beam configurations will be described to illustrate the breadth of the invention.

Figure 1:
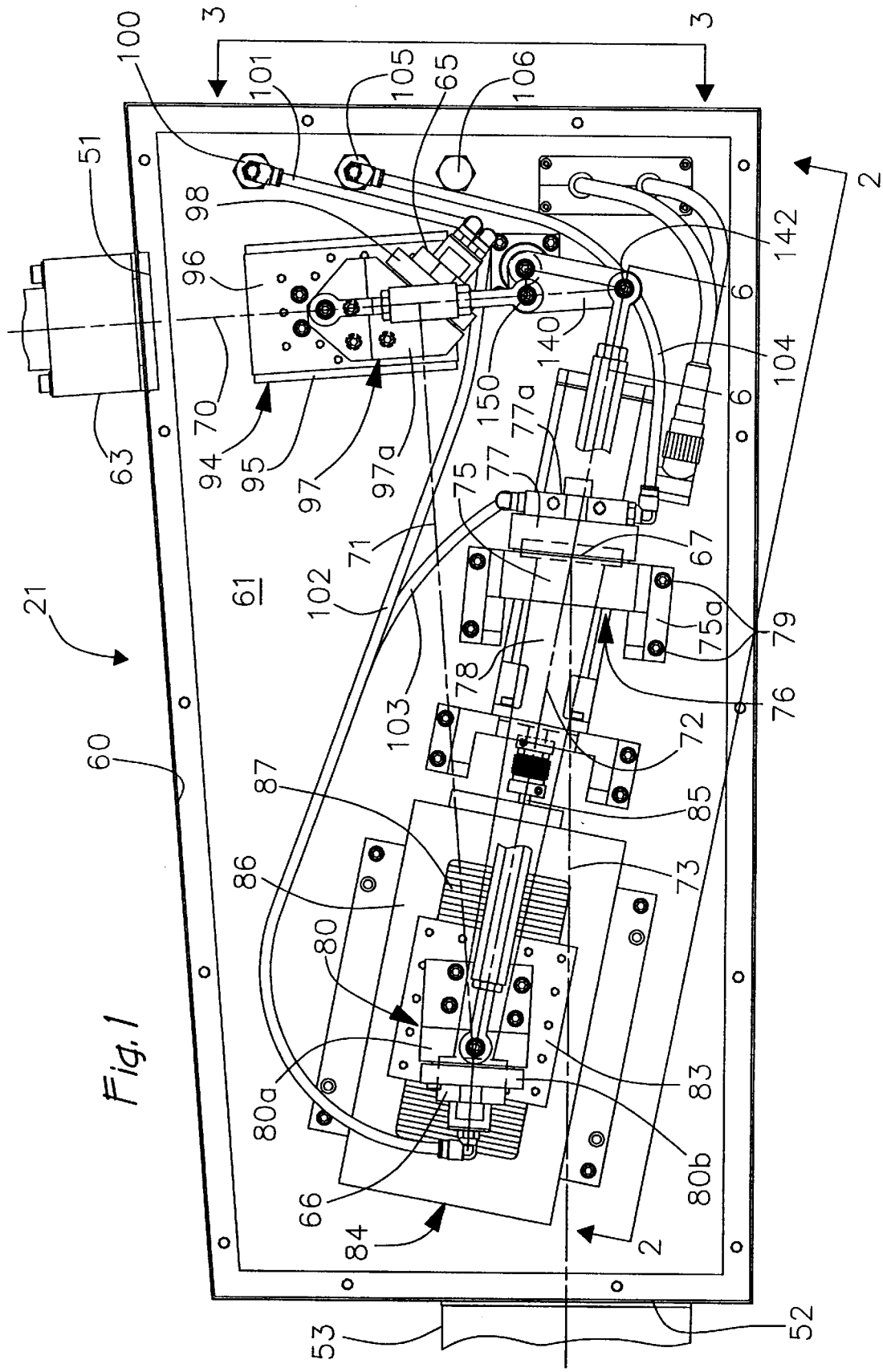
FIG. 1 is a plan view of a collimator exemplifying a preferred embodiment of the present invention.
Figure 2:
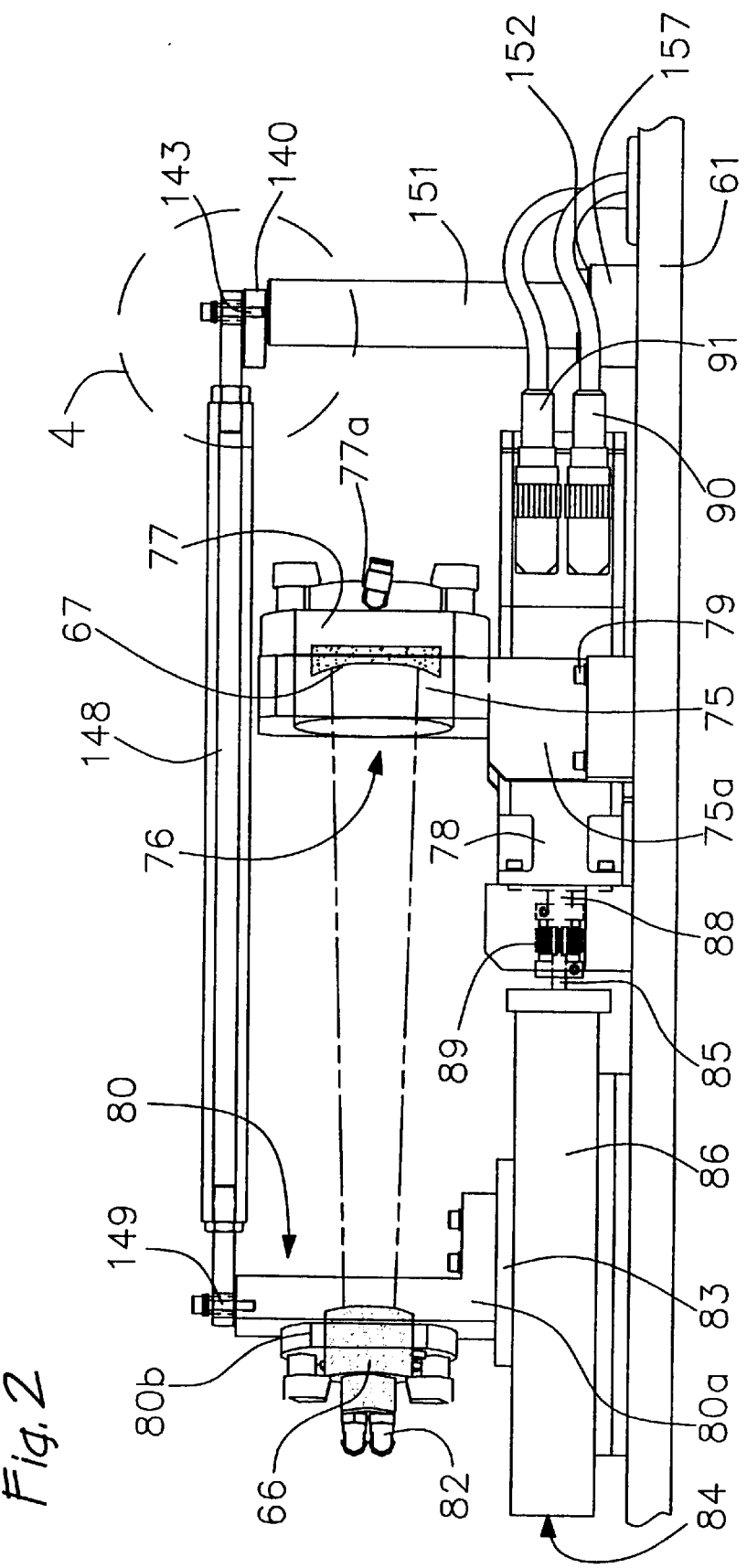
FIG. 2 is a partial view of the collimator in elevation, with the enclosure removed, taken along the line 2—2 of FIG. 1.
Figure 3:
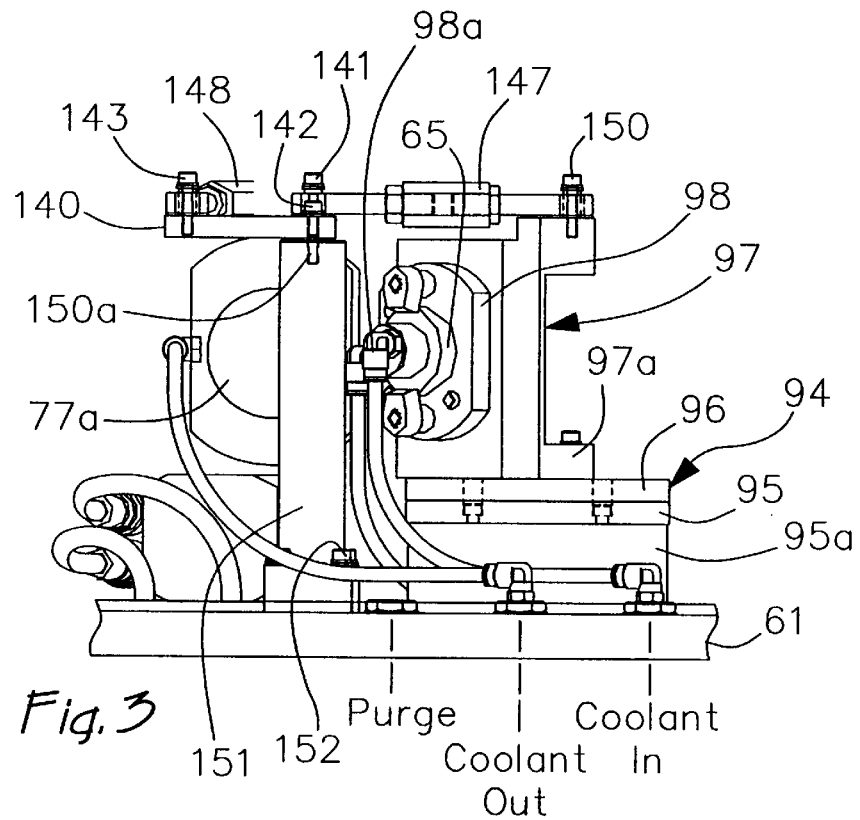
FIG. 3 is a partial sectional view, in elevation, with the enclosure removed taken along the line 3—3 of FIG. 1.

With that in view, attention will be directed to FIG. 1 supplemented by FIGS. 2 and 3. FIG. 1 shows parts of an enclosure 60 used to house the collimator generally indicated at 21. The enclosure 60 includes a base plate 61 which is the support for the optical elements of the device, all of which are supported so that the optical axes are in a single plane. The input port 51 includes a coupling 63, shown only schematically, for connection to the output port of a laser, to seal the beam path. The output port 52 has a schematically illustrated coupling 53 to seal the output beam path for connection to the remainder of the beam delivery system of a machine tool.

The preferred collimator of FIG. 1 includes three precision optical mirrors. The laser source projects a beam through input port 51 which is reflected by first mirror 65 to a second mirror 66. The second mirror, 66, in turn is angled to reflect the beam to a third mirror 67 which thereupon reflects the beam to the output port 52. The alignment and relative positioning of the mirrors is precisely established in the collimator to assure that beam propagation axis coincides with the mirror centers. In the preferred embodiment the input mirror 65 is a zero phase shift plano (flat) mirror, although it could be a quarter-wave phase retarding circular polarizing mirror. The second mirror 66 is convex, and the third mirror 67 is concave. The second and third mirrors make up a mirror pair with curved, reflective surfaces, which cooperate to adjust beam divergence, as will be described. The beam path through the collimator is illustrated by the dashed center line which projects through the input port 51, a first beam element 70 being directed from the input port to the first mirror, a second beam element 71 being directed from the first to the second mirror, a third beam element 72 being directed from the second to the third mirror, and a fourth beam element 73 being directed from the third mirror to the output port 52. Adjustment of the length of the beam element 72 will be used in the illustrated embodiment to adjust the divergence of the collimated output beam.

In the illustrated embodiment the third mirror assembly 76 is fixed to the base 61, so that it cannot and need not move during the adjustment operation. As best seen in FIG. 2, the mirror assembly 76 is made up of a mirror mount 75 which has a high quality optical mirror 67, preferably metal and usually copper, carried within the holder 77, and configured with apparatus 77a at the back of the mirror holder 77 adapted to pass a coolant through internal passages in heat exchange relationship with the mirror to prevent excessive temperature rise of the mirror. The mirror mount 75, which could be bolted directly to the base, in the illustrated embodiment is preferably constructed with a straddle bracket 75a which straddles a servo motor 78. The purpose of the servo motor will be described below. The mirror mount bracket construction 75a allows the mirror mount 75 to be affixed directly to the base as by bolts 79, while allowing room for the servo motor 78 to be folded back within the configuration to reduce overall collimator size.

In the preferred embodiment, the other two mirrors, namely mirrors 65 and 66 are linearly translatable over predetermined non-parallel axes. The manner in which that is accomplished will first be described in connection with intermediate mirror 66. Referring again to FIGS. 1, 2 and 3, it will be seen that mirror assembly 80 includes a mirror mount 80a, which has a high quality optical mirror 66, preferably metal and usually copper, carried within the holder 80b. The mirror 66 is fitted with coolant conveying elements 82 for supplying cooling fluid to passages internal to the mirror to prevent excessive temperature rise of the mirror. The mirror mount 80a is fixed to a slide plate 83 which can translate along a base 86 of a slide assembly 84. In the preferred embodiment, in order to assure the precision and accuracy desired in this application, a precision optical slide, which is a commercially available component, is utilized. Simpler configurations, with less restrictive accuracy demands, can use more conventional way and slide type structures. The optical slide assembly 84 of the illustrated embodiment, utilizes an internal ball screw, rotated by an input shaft 85. The ball screw rides in a ball nut (not shown) which is coupled to the slide plate 83 to cause the slide plate to be driven in very precise measured amounts along base 86 (see FIG. 1). Preferably the internal working elements are covered by a bellows 87 for protection.

The previously mentioned servo motor 78 has its output shaft 88 connected by a coupling 89 to the input shaft 85 of the slide assembly 84. The servo motor has electrical connections 90, 91 for power and feedback respectively. Those connections can be brought back to a programmed CNC controller for operating the servo motor which in turn drives the mirror 66 along its slide. It will be appreciated from FIG. 1 that the slide assembly 84 is precisely aligned with the portion 72 of the beam path which is directed from the second to third mirrors. Thus the mirror 66 will be moved toward or away from the mirror 67 while maintaining optical alignment between those elements.

The input mirror 65 is also preferably mounted on an optical slide assembly 94 which includes a base 95 fixed, via spacer block 95a, to the base 61. The base 95 of the optical slide assembly 94 carries a slide plate 96 to which is mounted mirror assembly 97, which includes a mirror mount 97a, which has a high quality optical mirror 65, preferably metal and usually copper, carried within a holder 98. The mirror 65 is fitted with coolant conveying elements 98a for supplying cooling fluid to passages internal to the mirror to prevent excessive temperature rise of the mirror. It will be seen from FIG. 1 that optical slide assembly 94 is arranged to translate the slide plate 96 and mirror 65 along the element 70 of the beam path.

For completeness, it will be pointed out that FIG. 1 illustrates the coolant flow in which an inlet port 100 conveys coolant to the system which is piped by a first tube section 101 to the first mirror, and, after passing through passages associated with that first mirror, through a second tube section 102 to the second mirror, and, after passing through passages associated with that second mirror, through a third tube section 103 to the third mirror, and, passes through the associated third mirror apparatus whereupon a fourth tube section 104 conveys the fluid to a coolant output port 105. A separate port 106 is provided for input of purge gas, in the preferred embodiment specially scrubbed air, to maintain the inside of the collimator enclosure at a slightly elevated pressure to prevent ingress of contaminants or those components of dried-filtered air undesirable in the beam path. As noted, the enclosure for the collimator is tightly sealed, and the scrubbed air through the port 106 further assures the cleanliness of the internal elements.

Figure 5:
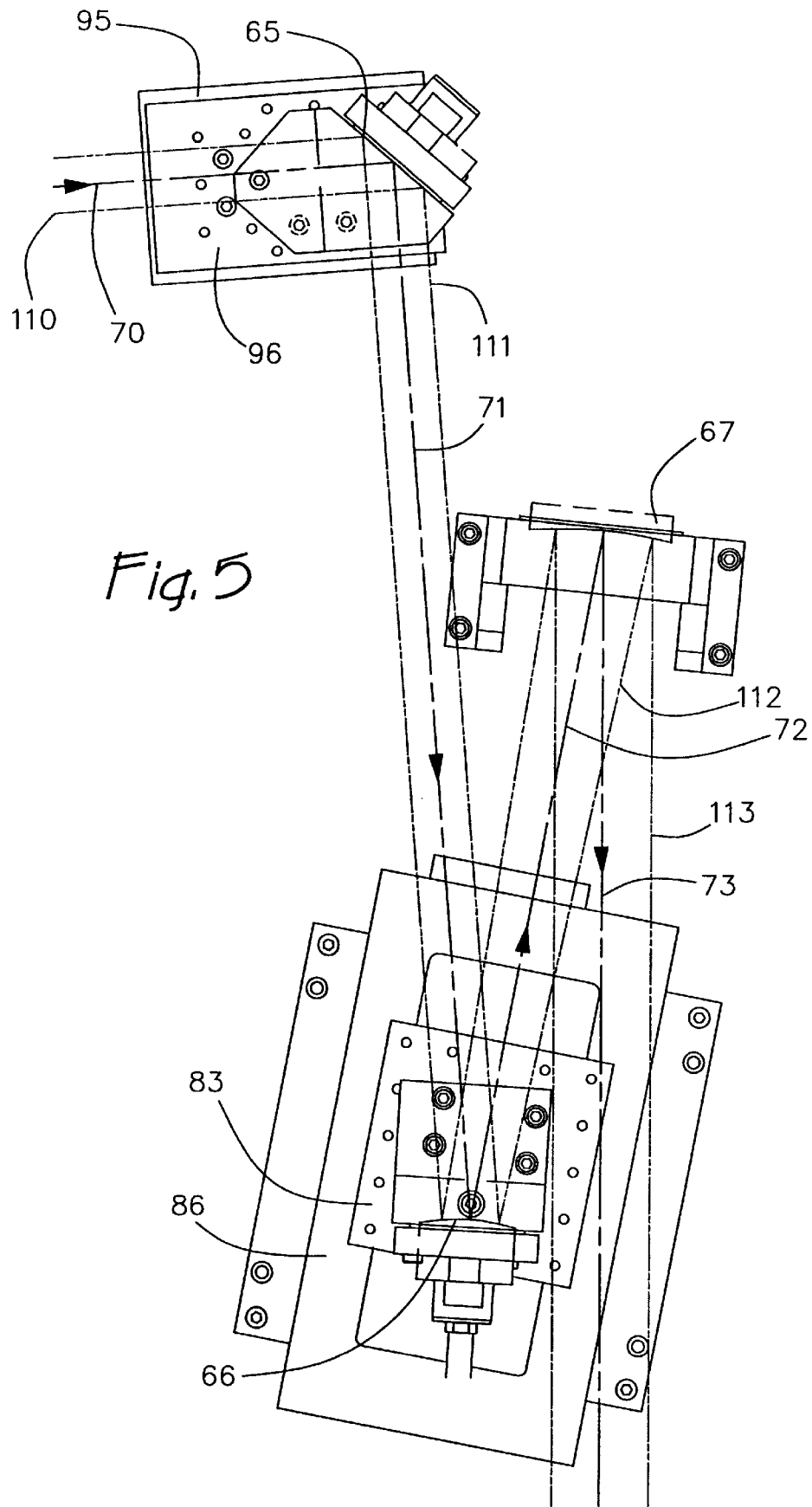
FIGS. 5, 6 and 7 are diagrams of the optical elements of the collimator of FIG. 1 showing the effect on beam divergence achieved by differently adjusted positions of the collimator.
Figure 6:
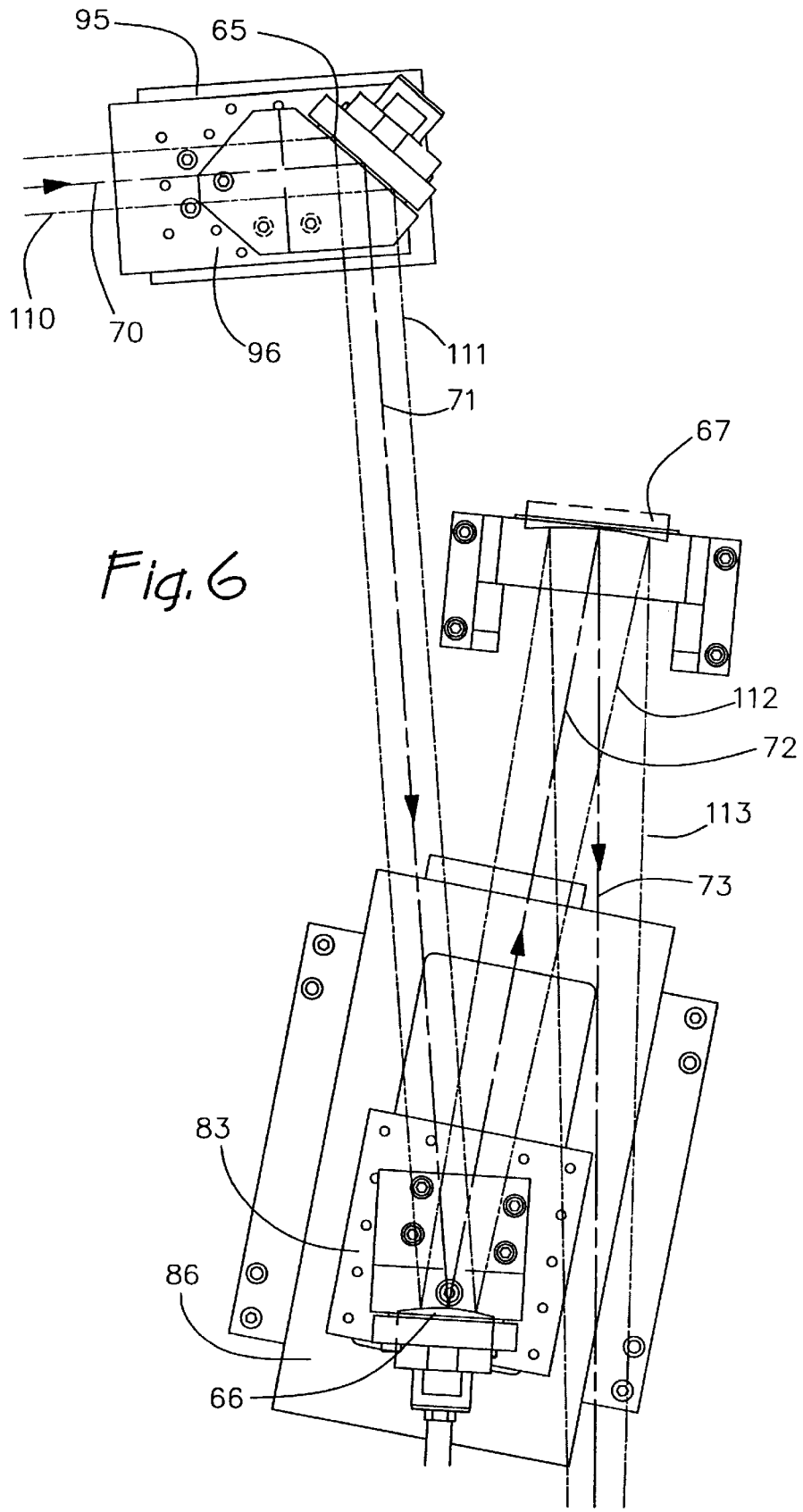
Figure 7:
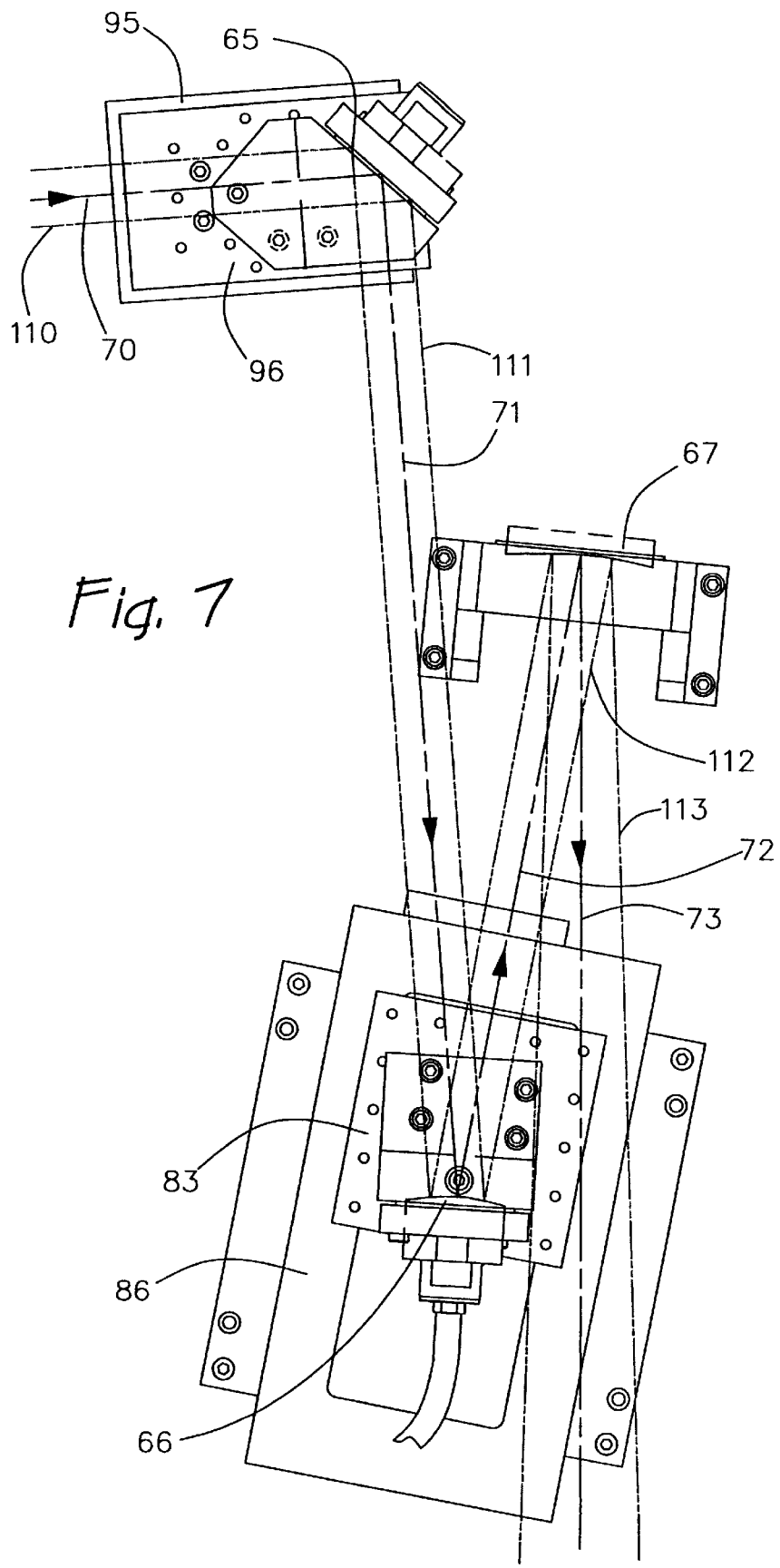

FIGS. 5, 6 and 7 are simplified schematic drawings of the preferred embodiment of the invention, and illustrate the translation of the movable mirrors to adjust output beam divergence. The mechanism for performing the adjustment will be shown later. The input beam path 70 is shown at the center of an input laser beam 110 and is incident on the plano mirror 65. A reflected laser beam 111, of roughly the same size and shape, is centered on the beam path element 71, and is incident on the convex mirror 66. The relative positions of the centers of curvature of the curved mirrors 66 and 67 will determine the amount of divergence of the output beam.

In the FIG. 5 illustration, the slide plates 83, 96 are in their middle separation distance position, to produce a collimated output beam with minimum divergence. The mirror 67 is concave in shape, with the shape coordinated to the convex shape of the mirror 66, so that, at the center position mirror separation, the diverging beam which impinges on mirror 67 is converted to a roughly parallel collimated output beam.

In the FIG. 6 illustration, the slide plates 83, 96 are in their largest separation distance position, to produce an output beam with negative divergence or a converging output beam. The mirror 67 is concave in shape, with the shape coordinated to the convex shape of the mirror 66 such that, when the mirror separation is greater than that at the center position in FIG. 5, the diverging beam which impinges on the concave mirror 67 is converted to a converging output beam.

FIG. 7 shows the opposite extreme of adjustment of the collimator in which the slide 83 is adjusted so that the mirror 66 is in its closest relative position to the mirror 67. In this adjusted position, an output beam is produced with maximum divergence. The mirror 67 is concave in shape, with the shape coordinated to the convex shape of the mirror 66 such that, when the mirror separation is less than that at the center position in FIG. 5, the diverging beam which impinges on mirror 67 is converted to another diverging output beam.

It will now be appreciated that relative adjustment of the mirror 66 along the axis established by the slide on which it is mounted can be used to continuously vary the divergence of the collimated beam between the limits established by the travel. It will now also be appreciated that the servo motor 78 discussed above drives the ball screw of the slide assembly 84 to translate the slide plate 83 along the slide axis to thereby achieve the continuously variable beam divergence adjustment described above.

In accordance with the invention, a linkage is provided between the relatively movable mirrors in the collimator in order to maintain optical alignment through the collimator as the adjustment for beam divergence, described above, is accomplished.

Thus, in the illustrated embodiment, the positions of the input and output segments of the beam path, namely segments 70 and 73, remain constant, and the mirror 66 translates along the beam path 72, which likewise remains constant in position. However, in order to maintain optical alignment between the elements in that arrangement, the beam path 71 must translate as the mirror 66 translates. With that being accomplished in accordance with the invention, optical alignment is maintained throughout the adjustment range. Alignment is maintained by causing the mirror 65 to translate along its optical slide assembly 94 in proportion to the movement of the mirror 66 along its optical slide assembly 84. Thus, comparing FIGS. 6 and 7, it will be seen that with the mirror 66 in its substantially extended position (toward the bottom of the drawing in FIG. 6), the mirror 65 is in a substantially rearward (to the left) position, so that the beam element 71 alignment is maintained between the centers of the respective mirrors. Comparing FIG. 7 to FIG. 6, it will be seen that the mirror 65 is translated to the right, to bring the beam path 71 to the right of the position illustrated in FIG. 6, although parallel with that position, to maintain alignment between the center of mirror 65 and the newly adjusted position of the translatable mirror 66.

Figure 8:
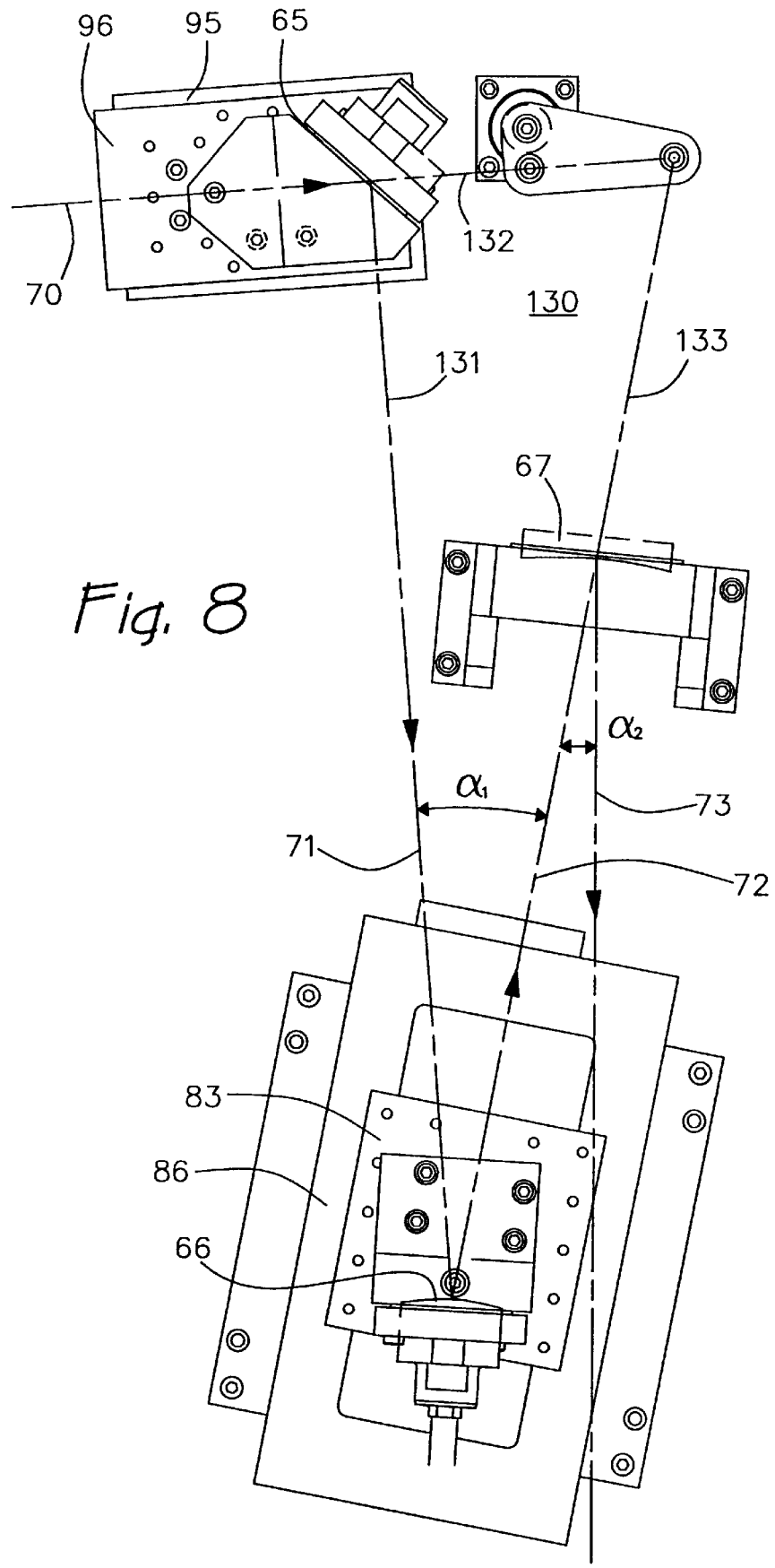
FIG. 8 is a diagram similar to FIG. 5 but illustrating important angular relationships in the beam path geometry of the collimator of FIG. 1.

The significance of the linkage which maintains alignment will be better illustrated with reference to FIG. 8 which illustrates the geometry of the beam path in the center or "reference" position of FIG. 5. In that position, the beam path elements create a triangular geometry which is replicated in the linkage to cause movement of the translatable mirrors in unison while maintaining optical alignment. Thus, it can be seen that the beam element 71, which joins the centers of the mirrors 65 and 66 forms one side 131 of a triangle 130 which in this case is a right triangle. The beam path 70, when extended, forms a second side 132 and the beam path 72 when extended as illustrated forms a third side or hypotenuse 133. Thus the triangle 130 having sides 131, 132, 133, forms a triangular pattern in the beam geometry which is replicated in the linkage.

The incident and reflected beams on mirror 67 form an angle $\alpha_2$. This is shown in FIG. 8 by the beam path element 72, 73 and the included angle $\alpha_2$. Since the slide 83 is aligned with the beam path 72, the angle $\alpha_2$ remains the same in this collimator. The beam paths incident and reflected on mirror 66, namely beam paths 71, 72, form an angle $\alpha_1$ as also shown in the drawings. The angles $\alpha_1$ and $\alpha_2$ must be chosen specifically to minimize distortion of the output beam after reflection from curved mirrors. The relationship between those two angles is determined by the magnification of that portion of the optical system. That relationship can be expressed mathematically as:

$$\alpha_2 = \sqrt{\alpha_1^2/(mag.)}.$$

Thus, if a magnification of 2 is desired, a definite relationship is established between the two angles. Considering the matter in another way, however, if during adjustment of output beam divergence, one of the angles changes with respect to the other, an undesirable effect on output beam quality is obtained. Thus, with $\alpha_2$ fixed, it is an object of the linkage to maintain $\alpha_1$ also fixed, thereby to maintain alignment, and prevent distortion in the optical system.

It can therefore be seen that, to maintain the correct alignment between the mirrors, mirror 65 must travel a distance proportional to the distance traveled by mirror 66 such that angle $\alpha_1$ remains constant. Following from the basic system geometry, the proportion which mirror 65 must move, in relation to mirror 66, is represented by the relation of the lengths of the short side 132 of triangle 130 and the hypotenuse 133 of triangle 130.

In accordance with the invention, a linkage is provided for interconnecting the translatable mirrors, the linkage having a three point pivot coupling, with the points of the pivot coupling establishing a triangle which is proportional to the beam geometry triangle 130. The location of the linkage may be translated with appropriate couplings to allow for a variety of locations in various implementations of the invention. It is necessary only to preserve the correct geometry. In the preferred embodiment, the linkage is implemented above the beam path to simplify the alignment and to provide a mechanism which reduces any off-axis forces which may tend to cause misalignment of the mirrors during adjustment. In the FIG. 9 embodiment, the linkage geometry is illustrated in the center or reference position. The pivotable coupling is illustrated at 140. The coupling 140 has three pivot points 141, 142, 143; connecting the pivot points forms a triangle 144 similar to triangle 130, and therefore having proportional sides and equal angles. Thus, the hypotenuse of the triangle 130, illustrated in FIG. 9 as having a length B, has a proportionality to the hypotenuse 145 of the triangle 144, illustrated as having a length B'. Similarly, the short side of the triangle, illustrated as having a length A, has a proportionality to the short side 146 of the triangle 144, illustrated as having a length A'.

Figure 9:
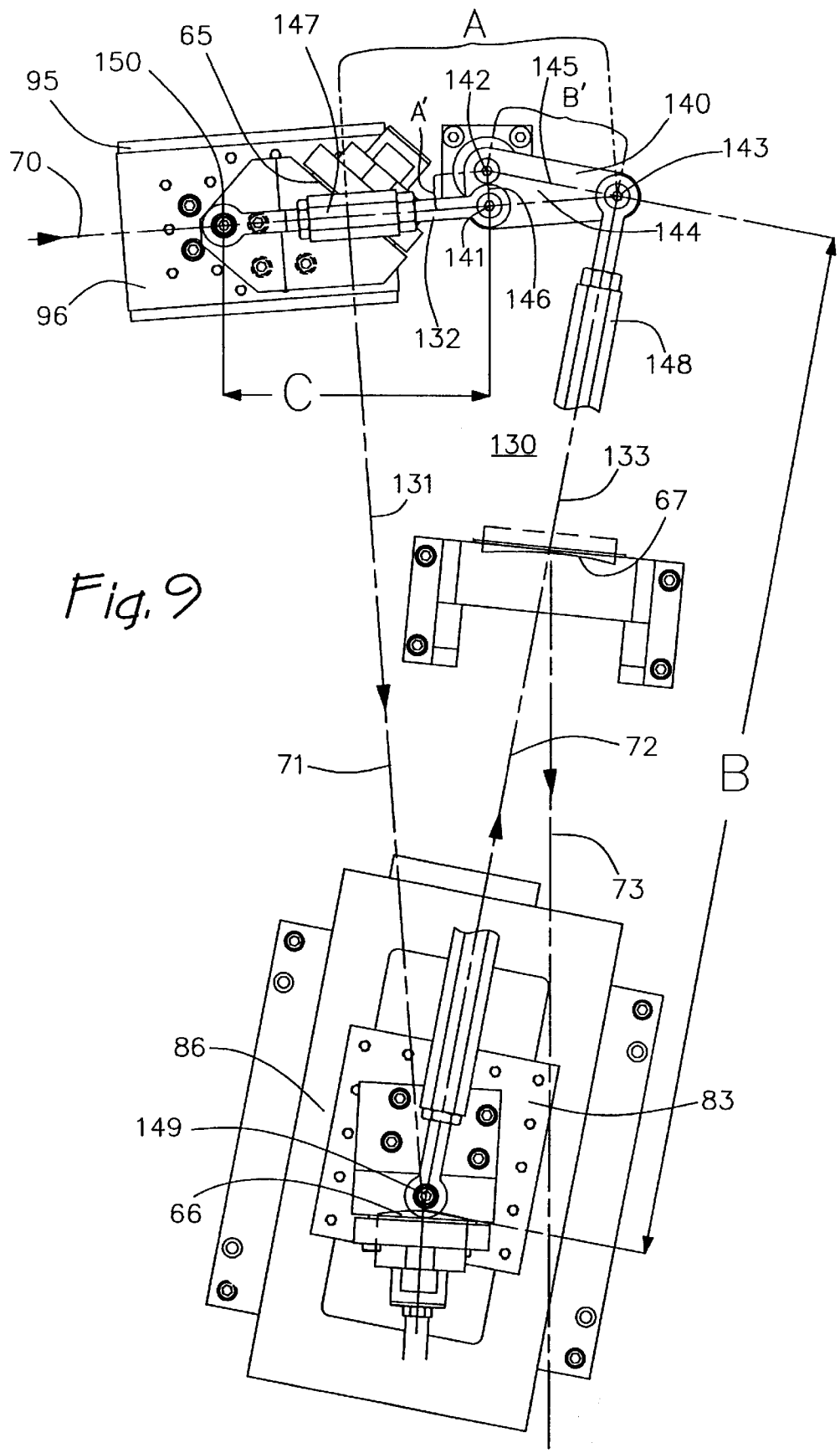
FIG. 9 is a diagram similar to FIG. 5 but illustrating important relationships between the beam path geometry and the linkage which operates the linearly translatable mirrors.

In the FIG. 9 embodiment, the pivot point 141 is located above the leg 132 of the triangle 130. A link 147 is then provided and is connected between the pivot point 141 and a pivot point 150 directly above the beam path on the mirror mount 97a for the mirror 65. The second pivot point 142 of the pivot coupling 140 is fixed with respect to the base of the collimator. Turning to FIG. 3 briefly, it will be seen that the pivot point 142 in the pivot coupling 140 is affixed at 150a to an upstanding rigid column 151 which in turn is affixed at 152 to the base plate 61.

In practicing the invention, the third pivot point 143 of the pivotable coupling 140 is connected by a pivotable link 148 to a further pivot point 149 directly above the beam path on the mirror mount 80a which carries the translatable mirror 66. The pivotable links 147 and 148 are conveniently configured with right hand and left hand threads and jam nuts in the respective knuckle elements thereof so that the link can be adjusted precisely to its desired length and the jam nuts tightened to establish the lengths of the links and the geometrical relationship between the beam path triangle 130, the pivot coupling triangle 144, and the links which connect the coupling to the mounts of the translatable mirrors.

Since the length A of the beam path triangle 130 is proportional to the length A' of the pivot triangle 144, and since the length B of the hypotenuse of the beam path triangle 130 is proportional to the length B' of the hypotenuse 145 of the pivot coupling triangle 144, the following proportionality is established:

$$A'/A = B'/B.$$

Rearranged this leads to the relationship:

$$A/B = A'/B'.$$

When the collimator is adjusted, the coupling pivots about pivot point 142. The distance that pivot points 141 and 143 travel will be proportional to the distance between each pivot point, 141 and 143 respectively, and the point 142 about which they pivot. This may be seen from the following equation describing the distance traveled "d" around the edge of a circle being equal to the angle moved "θ" (in radians) multiplied by the radius of the circle "r":

$$d = r \cdot \theta.$$

Referring to FIG. 9, as both pivot points 141 and 143 are on the pivot coupling they must each pivot around pivot point 142 by the same angle of travel through which the pivot coupling rotates. Therefore, as the angle of rotation is the same for each pivot point 141 and 143, then the distance that each pivot point travels must be proportional to each radius of rotation. The radius of rotation for pivot point 141 is the distance A'. The radius of rotation for pivot point 143 is the distance B'.

In the illustrated embodiment, the length of the link 148 was selected to correspond to the distance from the pivot point 143 to the approximate center of the reflective surface of mirror 66. Referring to FIG. 9, for example, the amount of rotation of pivot coupling 140 will increase per linear unit of travel of mirror 66 as the collimator is adjusted away from the center position.

A small movement of pivot point 143 near the center position, as described in FIG. 9, will correspond to an almost equal amount of movement of pivot point 149. The movement of pivot point 143, when near the center position, is in nearly the same direction of travel as is pivot point 149 and, as these two points are connected by a link 148, which has a set length, then it may be seen that both pivot points will travel nearly the same distance.

When the collimator is adjusted away from the center position, pivot 143 rotates around pivot 142 and thus the direction of travel of pivot point 143 is continuously shifted further away from the original direction of travel near the center position. Pivot point 149 continues in the original direction and, as pivot 149 and 143 are connected by link 148, pivot point 143 must pivot further around pivot 142 to displace the necessary distance in the original direction of travel.

In other words, the amount of rotation of pivot coupling 140 will increase per unit length of travel of mirror 66 (including pivot point 149) as the hypotenuse 145 of triangle 144 moves away from the original perpendicular alignment with hypotenuse 133 of triangle 130. A similar combination of movements will be seen occur for the other linked mirror 65 and the associated pivot points 150 and 141.

To maintain alignment during collimator adjustment, the length C from pivot 141 to pivot 150 is chosen to preserve the same proportion of angular deviation for link 147 as exhibited by link 148. The relation of B' to B is reproduced by the relation of A' to C such that:

$$B'/B = A'/C.$$

It will be noted that the choice of length for link 148 to correspond to length B is not a necessary condition. The link 148, for example, can be coupled to the carriage of mirror 66 at any point above the beam path 72, translating pivot point 149, so long as the above proportionality is maintained by similarly adjusting the length of the link 147 and the location of its pivot point 150 above beam path 70.

In summary, when it is desired to increase the divergence of the output beam, the servo drives the slide plate 83 to move the mirror 66 closer to the mirror 67, in effect, shortening the length of the beam path 72. Movement of the slide plate acts through the link 148 to pivot the coupling 140 about the pivot center 142. In other words, the pivot point 143 swings upwardly about the center 142 as the slide plate 83 is driven upwardly. That has the effect of pivoting the pivot center 141 about the center 142 also in the counterclockwise direction, causing the slide plate 96 to move to the right a proportional amount. The coupling causes the movement to occur in proportion which, in effect, translates the beam path 71 to the right while maintaining that beam path parallel to its original position.

Recalling from FIGS. 1 and 2 that a single servo motor can be coupled to the slide plate 83 of the optical slide assembly 84, it will be seen that simply controlling the position of the slide plate 83 which is a direct control over the output beam divergence, serves to operate through the linkage which has just been described, to reposition the slide plate 96 to maintain beam alignment throughout the geometry of the collimator from one adjustment extreme to the other.

The linkage mechanism is not only theoretically correct in maintaining the beam alignment according to the proportionality relationships described, but it is also robust, which would allow the collimator to operate in real time to continuously adjust beam divergence and thus beam size at the cutting head as the cutting head traverses the workpiece and as the laser power level changes during normal operation. The pivot coupling itself is rigidly mounted on an upstanding post so that it rides in the correct plane. The post 151 is illustrated in FIGS. 2 and 3. It can readily be made sufficiently rigid.

Figure 4:
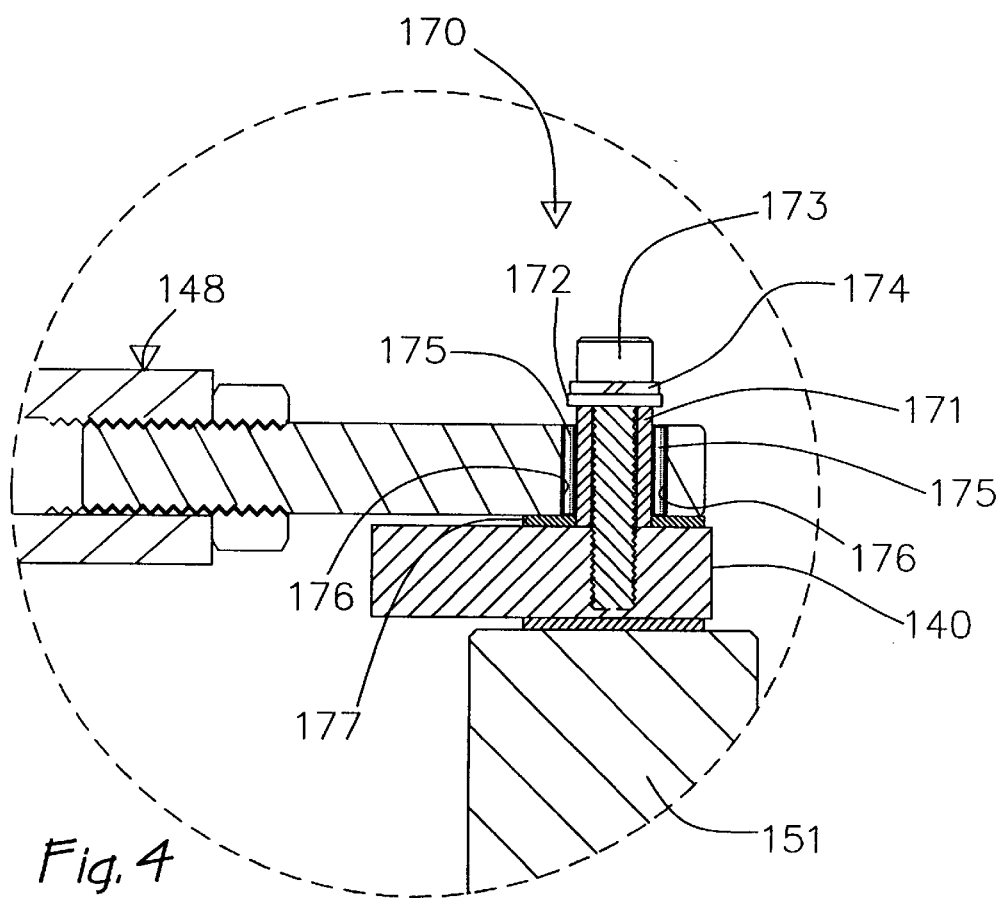
FIG. 4 is a partial view of the area within the dashed circle 4 of FIG. 2, showing the details of a preferred form of preloaded joint used in the mechanical linkage of the collimator.

There are five pivot points in the linkage, one on each of the slides, and three on the pivot coupling. In the preferred embodiment, each of those five pivot points is formed of a preloaded joint which is adapted to precisely position the center without any radial play, and to provide long life under relatively continuous operation. FIG. 4 illustrates, in enlarged form, one such pivot coupling. It will be seen that in the preferred embodiment the preloaded joint 170 is made up of a drill bushing 171 which has a hard outer surface to ride against a bearing, and a head 172 which allows clearance for the pivotable member. A bolt 173, carrying a lock washer 174, passes through the central aperture of the drill bushing 171 and is threaded into the pivotable plate 140. Thus the bushing 171 forms a fixed pivot point for the element which is to pivot thereon.

In the preferred embodiment, a needle bearing assembly 175 is press fit on the outer diameter of the drill bushing, and fits closely within the inner diameter of an apertured rod 176 which forms each end of the pivotable links 147, 148. Thus, the drill bushing serves as a pivot post about which rides the needle bearing mounted rod, with substantially no radial play and smooth guided movement as the mechanism pivots during the course of adjusting the collimator. A bearing spacer 177 or thrust washer, such as of a plastic material, is interposed between the pivot coupling 140 and the apertured rod 176. In the case of the preloaded joint which mounts the pivotable coupling to the post 151, it will be understood that a further bearing assembly is interposed between the pivot coupling 140 and the post 151 and that the pivot coupling itself is pivoted about the drill bushing. Preferably each of the five pivot points is constructed as described in connection with FIG. 4 to provide a smoothly functioning unit.

The foregoing embodiment of the invention is currently believed to be preferred, in part because it provides a reasonably compact structure. However, it will now be apparent that other configurations are possible within the scope of the invention.

Figure 10A:
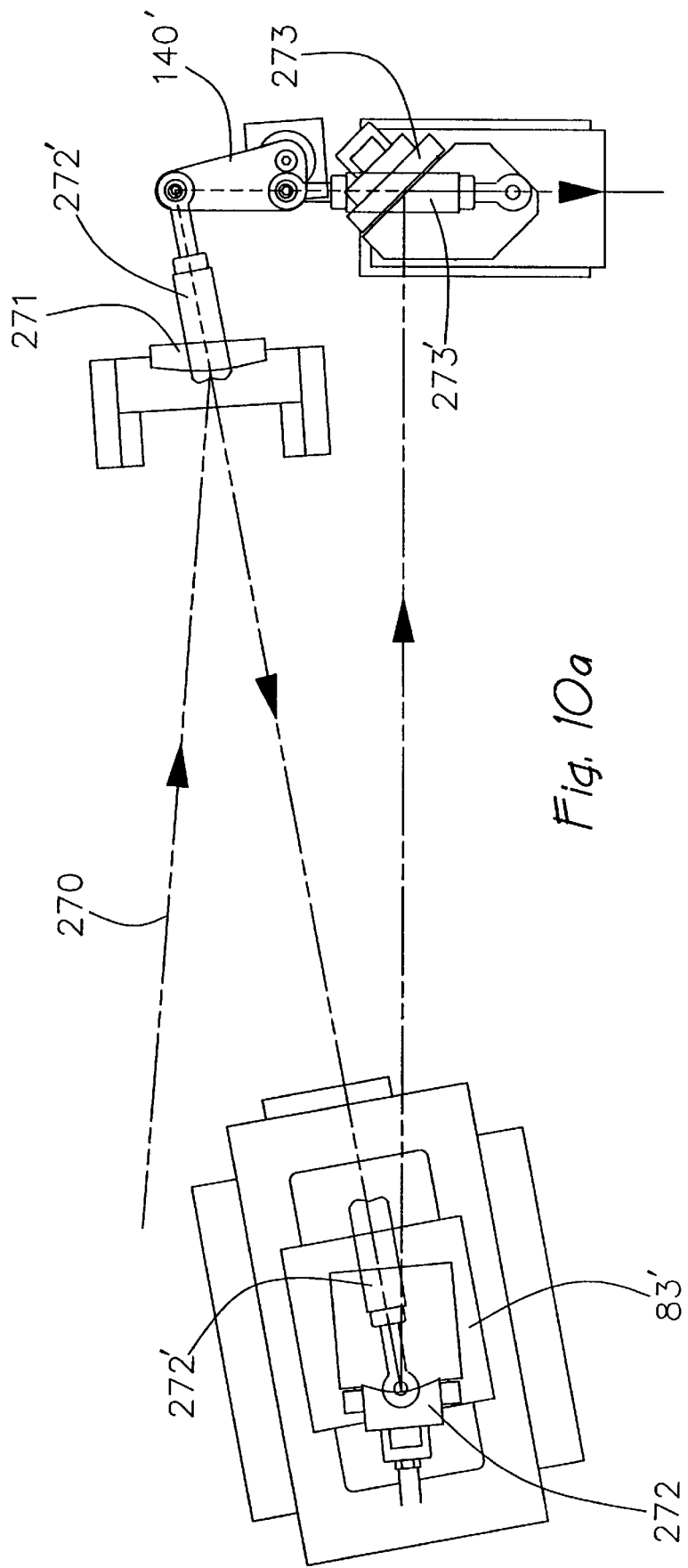
FIGS. 10a and 10b are diagrams schematically illustrating beam path geometry and the associated coupling linkages for alternative embodiments of the invention.
Figure 10B:
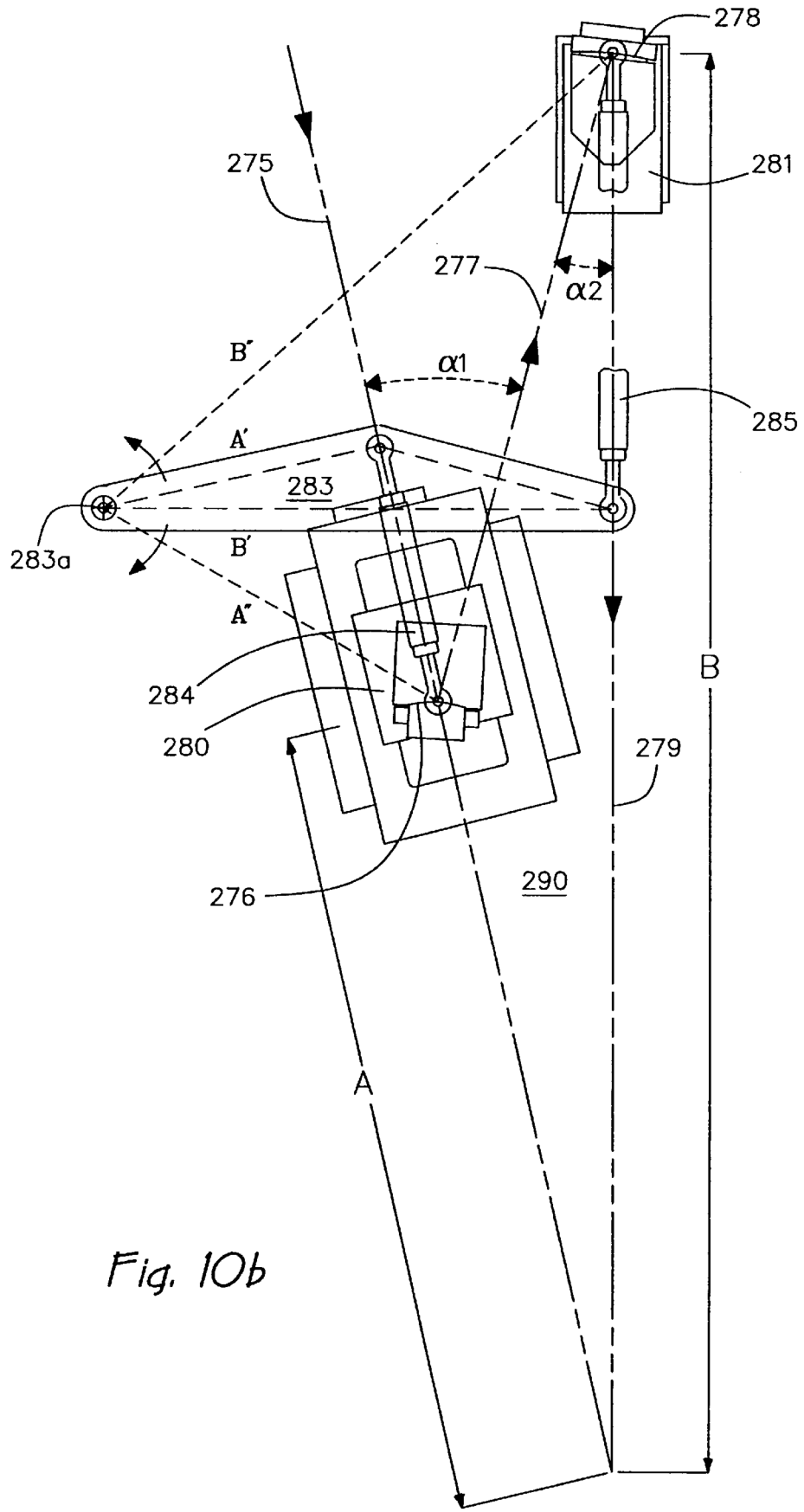

Referring to FIGS. 10a and 10b, there are shown two additional geometries which illustrate the breadth of the present invention. In the configuration of the above described preferred embodiment, FIG. 9, the first mirror is plano, the second mirror is convex, and the third mirror is concave. The intermediate mirror moves with respect to the third to adjust the beam divergence, and the coupling causes the first mirror to track the movement of the intermediate mirror to maintain beam alignment, all in accordance with the proportionality described above.

FIG. 10a illustrates a similar geometry but folded in a somewhat different fashion. In this case, an input laser beam 270 is first incident on a convex mirror 271 whereupon it is reflected to a concave mirror 272 and thence to a plano or circularly polarizing output mirror 273. The intermediate mirror 272 is moved toward or away from the convex input mirror 271 in order to adjust beam divergence. The triangular linkage, represented in the drawing simply by triangular coupling plate 140', is linked to the translatable mirrors by links 272', 273' (illustrated by link portion near the pivot points, but with the link centers removed so that the beam path geometry can also be illustrated). The triangular coupling plate with linkage causes the appropriate relative motion to have the mirror 273 track the position of the mirror 272 as it moves back and forth according to the direction of the slide 83' to adjust the beam divergence.

FIG. 10b illustrates a two mirror embodiment of the present invention. It demonstrates not only that it is possible to practice the present invention with only two mirrors, but it also emphasizes the significance of the subcombination of the two translatable mirrors in the three mirror embodiments.

Thus, in FIG. 10b, an input laser beam 275 is incident on a first mirror which is shown in the drawing as a convex mirror 276. The reflected beam 277 is directed to a concave mirror 278 which produces an output beam along a path 279. Output beam divergence is adjusted by adjusting the relative position of the mirrors 276 and 278.

In the illustration of FIG. 9b, both mirrors 276 and 278 are mounted on optical slides, 280 and 281 respectively, for linear motion in the direction along the associated beam paths. A pivotable linkage, illustrated by triangular coupling 283 pivoted at 283a and links indicated generally at 284, 285, establishes a proportionality between the beam geometry of the system and the triangular coupling 283, to control the movement of the mirrors 276 and 278 with respect to each other. In this case the triangle established the beam geometry is the triangle 290 established by the beam paths 277, 279 and beam path 275 extended as illustrated in FIG. 10b.

Thus, as mirror 276 translates downwardly to increase the output laser beam divergence, the linkage will cause the mirror 278 to move downwardly but a greater amount and on a different angle, so that the beam path 277 remains parallel to that shown in FIG. 9b, but is shorter so as to increase beam divergence. Similarly, when beam divergence is to be decreased, the mirror 276 is translated upwardly, which acts through the linkage including coupling 283 to move the mirror 278 upwardly. The mirrors when moving upwardly are moving such that the distance between them increases. As a result, the beam divergence is decreased. The geometry including the mechanical linkage and pivot coupling serve to maintain the beam path alignment throughout this operation, and the collimator can be configured as a simple two mirror system.

It will now be appreciated that what has been provided is a new collimator geometry which requires only two translatable mirrors for controlling output beam divergence. The mirrors are arranged to establish a non-parallel single plane beam geometry which defines a triangle. A linkage connects the two translatable mirrors and has pivot points arranged in a triangle which is similar to the beam geometry triangle. Pivotable links between the pivot coupling and the translatable mirrors are also in accordance with the triangular geometry and proportionality of the triangles. Translation of one mirror acts through the linkage including the triangular coupling to translate the other mirror, thereby maintaining optical alignment in the collimator while controlling output beam divergence.

What is claimed is:

1. A three optical element collimator having an input for a laser beam, an output for a collimated beam, and adapted to precisely adjust the divergence of the collimated beam, the collimator comprising in combination:

a supporting base, three reflective optical elements establishing a beam path through the collimator, one optical element serving as an input optical element, one as an output optical element and one as an intermediate optical element, the optical elements including a curved pair for adjusting the collimated beam divergence, one of the optical elements being fixed to the base, and the other two being translatable, two optical slides each having a linear translation axis, the translatable optical elements being mounted on respective ones of the slides for translation along the respective axes, the optical elements in an operative position establishing a beam path which defines a triangular relationship, a mechanical linkage interconnecting the translatable optical elements, the linkage including a coupling having three pivot centers thereon, the pivot centers incorporating the triangular relationship defined by the beam path, one of the pivot centers being attached to the base so that the coupling can pivot about said one pivot center, and pivotable links connecting the other coupling pivot centers to pivot centers on the respective slides, so that movement of one slide operates through the linkage including the coupling to move the other slide in a proportion established by the triangular relationship.

2. The combination of claim 1 further including a drive mechanism for one of the slides, operation of the drive mechanism serving to translate said one of the slides and operate through the linkage to translate the other slide to maintain the alignment of the beam path while adjusting the divergence of the output beam.

3. The combination of claim 2 wherein the drive mechanism includes a servo motor.

4. The combination of claim 3 wherein the servo motor is fixed to the base, and the fixed mirror is mounted in a bracket which straddles the servo motor.

5. The combination of claim 2 wherein the pivot centers each include a loaded pivot joint including a bearing disposed between a fixed and pivotable member and arranged to minimize radial play.

6. The combination of claim 5 wherein each of the pivot centers includes a bushing fastened to a supporting structure at the pivot center, and wherein the bearing is interposed between the bushing and the pivotable member.

7. The combination of claim 1 wherein each of the optical elements has associated therewith coolant passages for cooling the optical elements, and further including means for supplying coolant to the passages for cooling the optical elements.

8. The combination of claim 1 wherein all three optical elements are in a common plane parallel to the base.

9. The combination of claim 1 wherein two of the optical elements are a convex/concave pair of mirrors, one of the pair being the optical element fixed to the base, and the other being one of the translatable optical elements, and a plano mirror serving as the other translatable optical element.

10. The combination of claim 9 wherein the plano mirror is the input optical element.

11. The combination of claim 9 wherein the plano mirror is the output optical element.

12. The combination of claim 1 wherein the triangular relationship defined by the beam path comprises a right triangle having its right angle at the center of reflection of the beam path at one of the optical elements, and having sides formed by the beam paths, and extensions thereof, established by the optical elements.

13. The combination of claim 12 wherein the coupling plate, at mid-travel position, has two of its pivot centers aligned with one of the beam paths which establish the triangular relationship.

14. A three mirror reflective collimator for use with a laser, the collimator having first and second optical ports connected by a beam path established by the optics of the collimator, the collimator comprising in combination:

a supporting base, three optical mirrors, a first and a second of the mirrors aligned so that they couple the beam path to the respective first and second ports, a third mirror being located intermediate the first and second mirrors for optically coupling them, the first mirror being fixed to the base, the second mirror being mounted on a slide for translation along a path aligned with its associated port, the intermediate mirror being mounted on a second slide and also being translatable, a precision linkage coupling the two translatable mirrors for coordinating their translation along their respective slides while maintaining them in optical alignment, the linkage including a coupling having three pivot centers thereon forming a triangle, one of the coupling pivot centers being fixed with respect to the base so that the coupling pivots thereabout, two pivotable links connecting the other pivot centers of the coupling to additional pivot centers on the respective slides, the lengths of the links being established proportionally to the triangle formed by the pivot centers of the coupling, and whereby translating one of the translatable mirrors along its slide causes the linkage to translate the other translatable mirror along its slide in optical alignment with the first translatable mirror.

15. The combination of claim 14 further including a drive for translating said one of the translatable mirrors.

16. The combination of claim 15 wherein the drive includes a servo motor.

17. The combination of claim 14 wherein the pivot centers each include a loaded pivot joint including a bearing disposed between a fixed and pivotable member and arranged to minimize radial play.

18. The combination of claim 17 wherein each of the pivot centers includes a bushing fastened to a supporting structure at the pivot center, and wherein the bearing is interposed between the bushing and the pivotable member.

19. The combination of claim 14 wherein two of the mirrors comprise a convex/concave pair, and one of the pair is the intermediate mirror.

20. A reflective collimator for coupling a laser beam from an optical port through the optics thereof to produce a collimated beam of controlled divergence at its optical output, the collimator comprising in combination:

a supporting base, an optical slide aligned with the input port and carrying an input mirror translatable along said slide, an output mirror of concave shape fixed to the base with the mirror being aligned with an internal beam path, established by an intermediate optic, to project the laser beam through the optical output, the intermediate optic being a mirror mounted on a second optical slide directed along a beam path to the output mirror, the second optic being convex to cooperate with the concave output mirror so that the distance between the convex and concave mirrors controls the divergence of the output beam, a drive controlling the position of the intermediate mirror along its associated optical slide, a mechanical linkage including two pivotable links and a coupling having three pivot centers, one of the coupling pivot centers being fixed with respect to the base, and the other two being connected by the pivotable links to translate the input mirror in such a way as to maintain optical alignment between the intermediate and input mirrors as the intermediate mirror translates toward or away from the output mirror in adjusting the divergence of the collimated output beam.

21. In a reflective collimator having an input port for a laser beam and an output port for a collimated laser beam, and having a beam path through optics of the collimator from input to output port, the beam path being adjustable for adjusting the divergence of the collimated beam, the combination comprising:

two positionally adjustable mirrors in the beam path, and arranged so that adjusting the relative position of the mirrors adjusts the collimated beam divergence, a slide for each positionally adjustable mirror, each slide being aligned with an element of the beam path, each slide carrying one of the adjustable mirrors, a linkage for moving the mirrors on their respective slides and for establishing the relative positions of the positionally adjustable mirrors, the linkage including a three pivot point coupling, with the pivot points establishing a triangle proportional to a triangle established by elements of the beam path, one of the pivot points being fixed with respect to the collimator so that the coupling pivots about said one pivot point, and pivotable links connecting the other coupling pivot points to the respective mirrors, the links being configured so that translation of a mirror on one slide acts through the associated link to pivot the coupling and thereby translate the mirror on the other slide a proportional amount to maintain the alignment of the associated mirrors on the beam path.

22. The combination of claim 21 in which the two positionally adjustable mirrors comprise a mirror pair with curved reflective surfaces.

23. The combination of claim 21 further including a third mirror in the beam path from input to output port.

24. The combination of claim 23 wherein one of the positionally adjustable mirrors has a planar face, the third mirror has a curved face, and the second positionally adjustable mirror has a curved face coordinated to that of the third mirror.

25. A mechanism for simultaneously moving first and second optics of a reflective laser collimator, comprising:

a coupling having first, second, and third pivot centers arranged in a triangle, the coupling adapted to pivot about the third pivot center;

a first track upon which the first optic is mounted for translation, the first optic being connected to the first pivot center of the coupling using a first pivotable link;

a second track upon which the second optic is mounted for translation, the second optic being connected to the second pivot center of the coupling using a second pivotable link; and a drive for translating the second optic and thus simultaneously translating the coupling and first optic, the triangular geometry of the pivot centers defining the movement of the first optic relative to the second optic.

26. A method of collimating a laser beam comprising the steps of:

providing a collimator having an input port coupled by a beam path to an output port and interacting with at least two mirrors within the collimator which are mounted for translation along respective non-parallel axes aligned with elements of the beam path, translating one of the mirrors along a beam path element to control the divergence of the collimated output beam, and translating the other mirror by a proportional amount dictated by the beam path geometry to maintain optical alignment from the input port through the collimator to the output port as the collimated output beam divergence is adjusted.

27. The method of claim 26 in which:

the step of translating one of the mirrors comprises translating a curved mirror along a beam path to cooperate with a further curved mirror for controlling the collimated output beam divergence, and the step of translating the other mirror comprises translating the further curved mirror.

28. The method of claim 26 in which:

the step of translating one of the mirrors comprises translating a curved mirror along a beam path to cooperate with a further curved mirror for adjusting the collimated output beam divergence, and the step of translating the other mirror comprises translating a planar mirror by said proportional amount to maintain optical alignment.

29. The method of claim 28 in which the planar mirror couples the input port to the curved mirror.

30. The method of claim 28 in which the planar mirror couples the curved mirror to the output port.

* * * * *